May 9, 1933. D. GERBER 1,907,957

CYLINDER AND PIPE CUTTING MACHINE

Filed Oct. 10, 1931 6 Sheets-Sheet 1

INVENTOR.
DWIGHT GERBER.
BY
ATTORNEY.

May 9, 1933.　　　D. GERBER　　　1,907,957

CYLINDER AND PIPE CUTTING MACHINE

Filed Oct. 10, 1931　　　6 Sheets-Sheet 2

INVENTOR.
DWIGHT GERBER.
BY *Philip S. Hopkins*
ATTORNEY.

May 9, 1933.  D. GERBER  1,907,957
CYLINDER AND PIPE CUTTING MACHINE
Filed Oct. 10, 1931   6 Sheets-Sheet 3
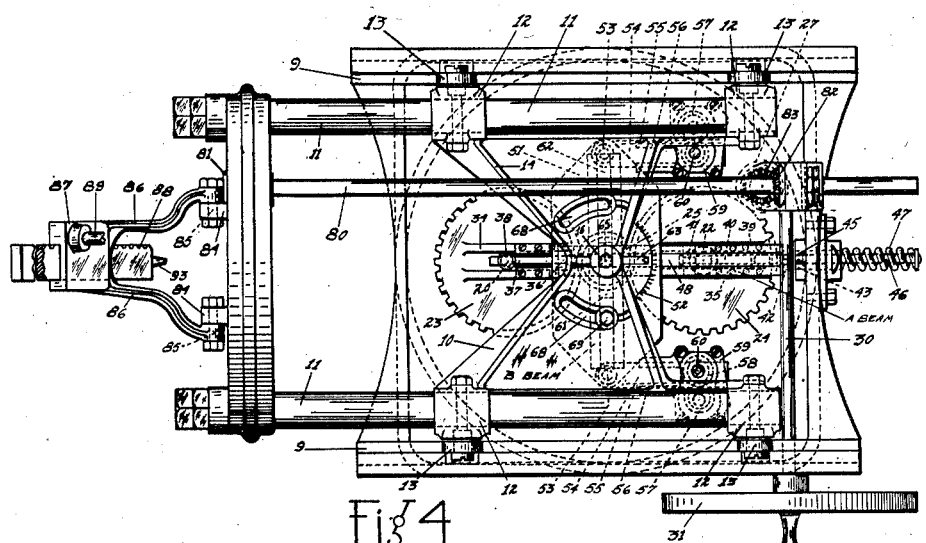
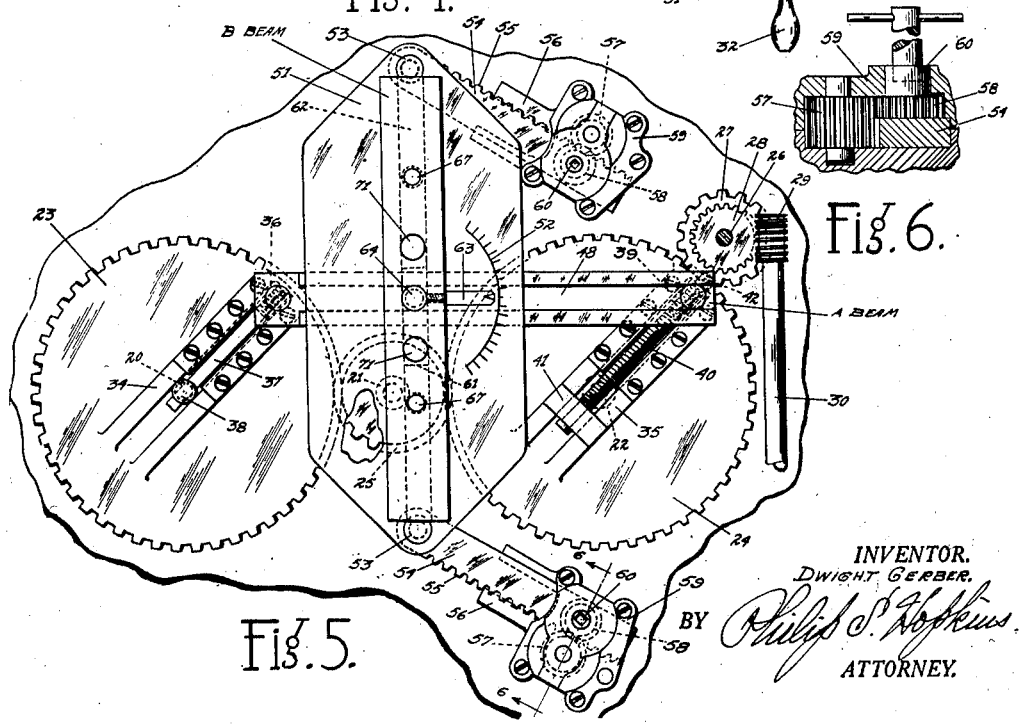
INVENTOR.
DWIGHT GERBER.
BY
ATTORNEY.

May 9, 1933.  D. GERBER  1,907,957
CYLINDER AND PIPE CUTTING MACHINE
Filed Oct. 10, 1931   6 Sheets-Sheet 4

INVENTOR.
DWIGHT GERBER.
BY *Philip S. Hopkins*
ATTORNEY.

May 9, 1933.  D. GERBER  1,907,957
CYLINDER AND PIPE CUTTING MACHINE
Filed Oct. 10, 1931     6 Sheets-Sheet 5

INVENTOR.
DWIGHT GERBER
BY
ATTORNEY.

May 9, 1933.  D. GERBER  1,907,957
CYLINDER AND PIPE CUTTING MACHINE
Filed Oct. 10, 1931   6 Sheets-Sheet 6

INVENTOR.
DWIGHT GERBER
BY *Philip S. Hopkins*
ATTORNEY.

Patented May 9, 1933

1,907,957

UNITED STATES PATENT OFFICE

DWIGHT GERBER, OF PITTSBURGH, PENNSYLVANIA

CYLINDER AND PIPE CUTTING MACHINE

Application filed October 10, 1931. Serial No. 568,123.

My invention relates to cylinder or pipe cutting machines and particularly to machines of this character adapted to form the ends and walls of pipe or cylinders for intersections with other pipe or cylinders of the same or varying diameters or with plane surfaces, preparatory to the joining and subsequent welding of the same together. It is known that the present tendency in the use of pipe in many trades is to form the joints or intersections by welding instead of by the slower and more expensive method of threading. Welded intersections have been found particularly suitable where the connections are to be made between varying pipe sizes and at varying angles, eliminating the expense of pipe fittings, nipples, threading requirements, etc.

My invention will be described and illustrated herein as applied to pipe cutting, although it is to be understood that it is not limited thereto and is applicable to other uses and cylindrical surfaces as well. For instance, the same generating mechanism described herein is also adaptable for guiding a welding unit instead of the torch or the cutting unit.

By my invention I have provided in a single composite machine, requiring no extraneous attachments and very few simple adjustments, an apparatus which mechanically and automatically generates and cuts a required line, A—on the end of a pipe for angular intersection with the end of another pipe of the same size, or a plane surface; B—on the end of the pipe for angular intersection with the cylindrical wall of another pipe of the same or larger size and either on or off center; C—on the cylindrical wall of the pipe to be intersected for angularly receiving the end of the pipe of the same or smaller size and either on or off center.

This invention is an improvement upon that described and claimed in my co-pending applications as follows: Serial No. 537,671, filed May 15, 1931; Serial No. 537,672 filed May 15, 1931; and Serial No. 537,673 filed May 15, 1931.

My invention embodies the use of a torch as a cutting element and by the automatic generating and cutting on the required line I have eliminated the slow and expensive operations heretofore necessary in preparing pipe for welded intersections, namely, mathematically plotting the desired intersection line, making a template therefore, scribing the line on the pipe and finally following the line with a torch or other cutting device. By my invention a few simple adjustments only are necessary corresponding to pipe sizes and angle of cut, and then upon operation of the machine the required line of cut is generated mechanically, the cutting torch following such line and simultaneously making the cut.

One object of my invention lies in the provision of a torch holding device and means for moving said holder and torch synchronously with the generation of the line of cut. Another and important object of my invention lies in the provision of an adjustable support for the generating mechanism whereby its position may be changed angularly with respect to the pipe or work whereby to generate and cut a line on the wall of the pipe on an angle thereto.

A further object lies in the provision of an adjustment whereby the generated line of cut may be either on center or off center with respect to the pipe being cut.

Still another object of my invention is to provide an adjustment for the generating mechanism whereby the machine is operable for a large range of pipe sizes.

A further object of my invention is to provide for a straight cut on the end of a pipe for intersection with another pipe end or with a plane surface at an angle thereto.

Many other objects and advantages in details of construction and arrangement of parts will be apparent as the description proceeds, reference now being had to the figures of the accompanying drawings forming a part of this application and wherein like reference numerals indicate like parts.

In the drawings:

Figure 4 is a top plan view of the machine in one position of adjustment and with the carriage mounted thereon.

Figure 5 is a fragmentary and somewhat diagrammatic view similar to Figure 2 illustrating the generating mechanism in another position.

Figure 6 is a detailed sectional view taken on the line 6—6 of Fig. 5.

Figures 9, 10, 11, 12, 13, and 14 are detailed views illustrating the various types of cuts of which this invention is capable and the purposes for which used.

Figure 15:
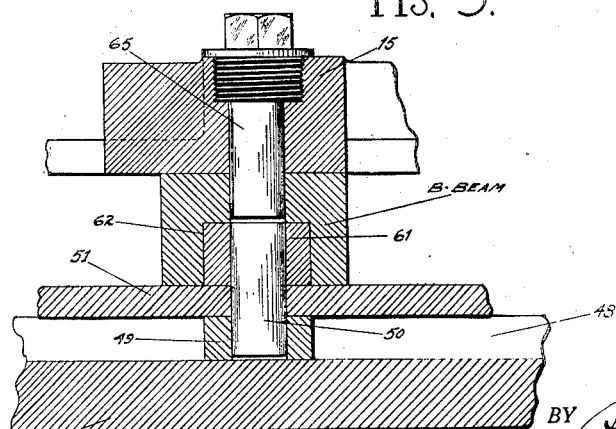

Figure 15 is a detail sectional view showing the connection between the carriage and the beams.

In describing this invention it should be kept in mind that the machine has two distinct functions, namely, forming the ends of pipe for joining or intersecting another pipe, and secondly, for forming the wall of the pipe by cutting a hole or opening therein, to match the end of an intersecting pipe. For convenience, therefore, in the following description it will be understood that where the term "intersecting" pipe is used, it refers to the pipe having its end formed for joinder or intersection with the wall of another pipe, and the term "intersected" pipe refers to the pipe having an opening in its wall to receive the intersecting pipe.

Figure 3:
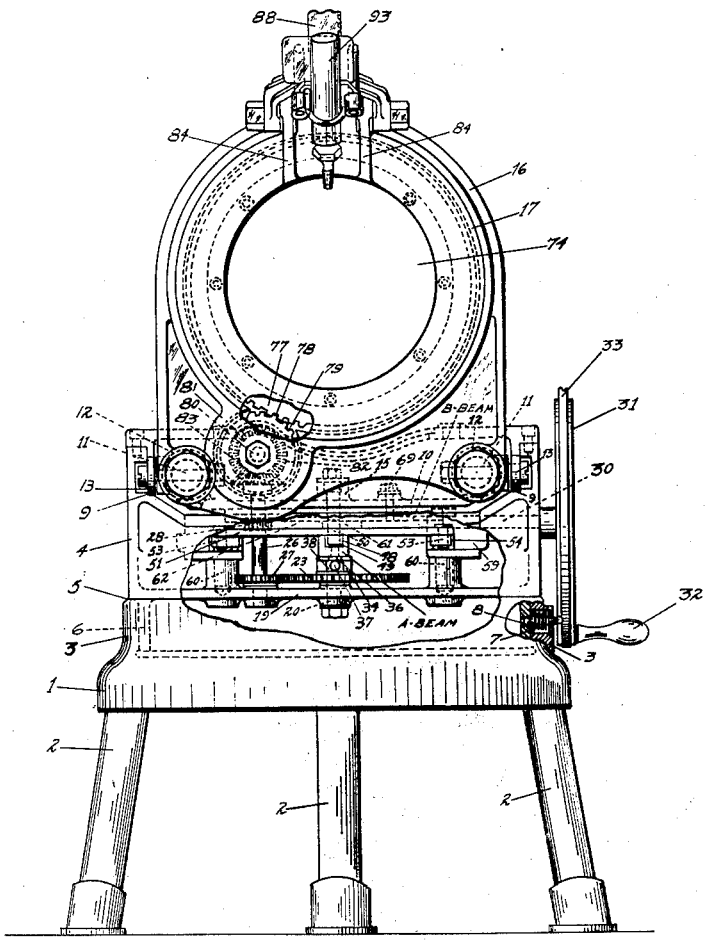
Figure 3 is a front view of the machine shown in Figure 1 with certain parts being broken away for clearness.

In carrying out my invention I provide a suitable base member 1 supported in any convenient manner, as by the legs 2 and the upper edge of which base member is circular and flanged as at 3 to rotatably support a housing 4, the lower circular edge of which is shouldered as at 5 to rest upon the upper edge of the flange 3, and having a downwardly depending flange 6 fitting just within the flange 3. The housing 4 is thus supported on the base for rotary adjustment and any suitable locking or friction holding means may be provided for maintaining the housing in any adjusted position. As shown in Figure 3 this locking or holding means may be in the form of a spring pressed pin 7 in the flange 3 adapted to engage one of a series of openings 8 in the flange 6. The purpose of this rotary adjustment will be clear as the description proceeds.

The upper edge of the housing 4, along two opposite parallel sides thereof, is provided with a trackway 9 (see Figures 3 and 4), along which is adapted to move a carriage indicated generally as 10. This carriage 10 comprises essentially a pair of parallel bars 11 supported in bosses 12, said bosses being provided with suitably journaled rollers 13 engaging upon the trackways 9 whereby the carriage may be moved longitudinally thereon. The bosses 12 are provided with inwardly extending web members 14 joined together centrally on the carriage, to provide a central supporting boss or bearing 15 for a purpose to be described.

Figure 1:
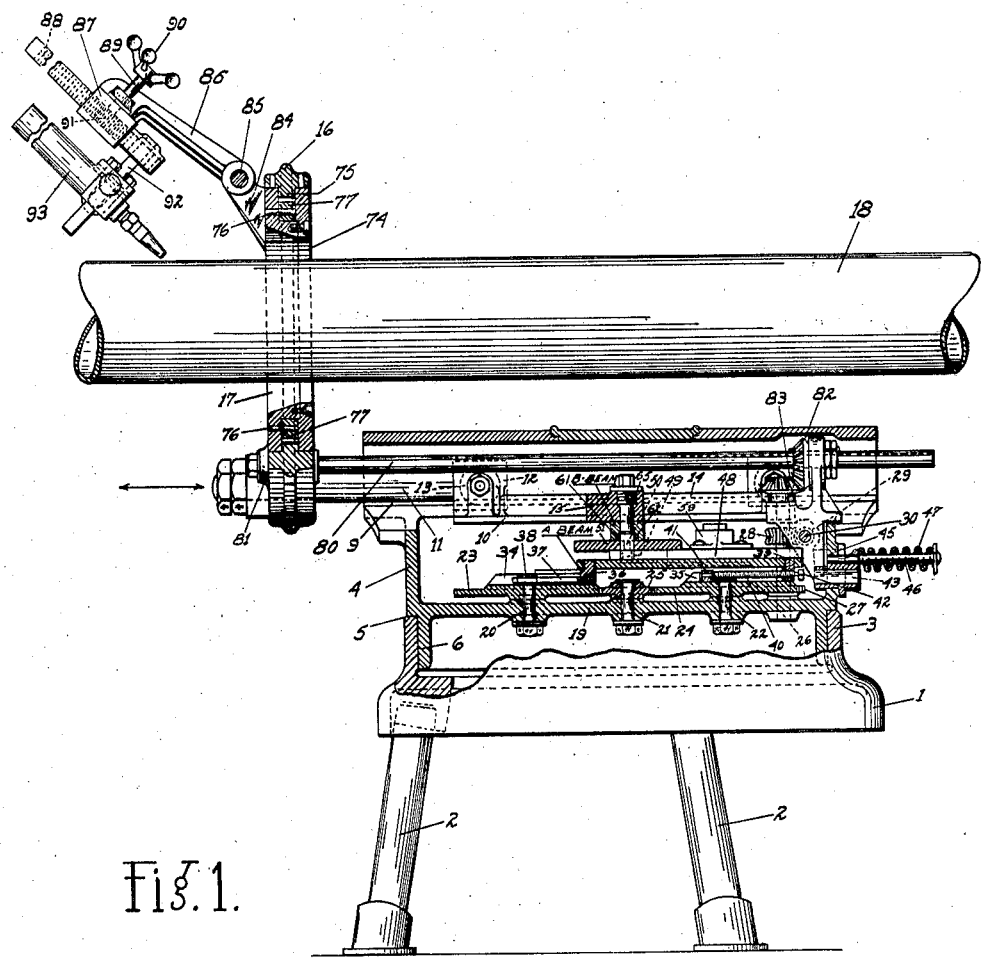
Figure 1 is a side view of a machine embodying my invention, certain parts being broken away and shown in section for clearness of illustration.

One end of the carriage 10 supports a ring member 16 which is provided with a rotatable torch-carrying ring 17. The ring member 16 carried by the ends of the bars 11 is positioned vertically and at right angles to the carriage. An opening 74 through the center of the ring permits the pipe to pass therethrough when in the position shown in Figure 1, in position for the torch to act thereon. The inner surface of the ring member 16 is provided with a circumferential rib 75 which serves as a guide or track for the rotatable ring gear torch support 17. Secured to this ring gear support as by the pins 76, is the ring gear 77, the teeth 78 of which mesh at one point with a pinion 79 suitably journaled on the end of a shaft 80 extending into an enlargement 81 on the casing of the ring member 16. The opposite end of the shaft 80 is provided with a miter gear 82 meshing with a similar gear 83 mounted upon the end of the shaft 26.

It is obvious, therefore, that upon rotation of the driving wheel 31 and the drive shaft 30, that the shaft 80 will be rotated synchronously therewith, resulting in rotation of the ring gear 77 and the torch bearing ring member 17 around the circumference of the pipe 18.

Brackets 84 mounted upon the torch-carrying ring member 17 pivotally support, as at 85, an arm 86 provided at its outer end with a slideway 87 in which is slidably positioned a rack bar 88. Also journaled on the end of the arm 86 is a stub shaft 89 provided with a hand wheel 90 on one end and a pinion 91 on its opposite end meshing with the teeth of the rack bar 88. One end of the rack bar is provided with two laterally extending pins 92 upon which is slidably mounted the cutting torch 93 which may be of any desired type or make.

By this pivotal mounting of the torch, the same may be adjusted toward and away from the pipe any desired distance and also in any desired angular position with respect thereto. In cutting the pipe for welding, it is desirable that the angle of cutting be such as to scarf the cut edge of the pipe whereby no further forming or processing is necessary to prepare the pipe for the welding operation. It may be stated here that the ring member 16 is supported symmetrically with reference to the line movement of the carriage 10, and that with the carriage in the position shown in Figures 1, 3 and 4, a pipe 18 may extend through the ring member 16, supported by any suitable means and concentric with the ring member, in position to have the end of the pipe adjacent to the said ring member formed for intersection as will hereafter appear. When the housing 4 and the mechanism carried thereby are adjusted to the angular position shown in Figure 7 or Figure 8, that is, with the torch supporting ring along side the pipe, the torch is of course, racked inwardly by means of the hand wheel 90 and the rack bar 88 so as to bring the same inwardly, through the opening 74 in the ring gear supporting member, into close proximity to the side wall of the pipe to be cut.

Assuming for the moment that the pipe 18 is, by way of example, a 6" pipe and it is desired to form the end of the same for intersection with the wall of an 8" pipe, such intersection to be welded. It is, therefore of course, necessary to cut the end of the pipe 18 in such shape that it will closely fit against the cylindrical wall of the 8" pipe to be intersected and that the cut on the end of the pipe 18 be accurate, smooth and even, and with its extreme end edges properly scarfed so that the inside diameter of the pipe 18 will be presented in a relatively thin edge form to the outside diameter of the pipe to be intersected.

It is the purpose of this invention as expressed in this machine, to, by a few simple adjustments of a generating mechanism to be described, automatically generate the proper curvature and shape of cut on the end of the pipe 18 in order to fulfill the above requirements, and to simultaneously cut the pipe end as before described in a smooth, even manner so that at the completion of one operation of the machine the end of the pipe 18 will be formed as above described.

To accomplish the above purpose a generating mechanism has been provided in the housing 4, supported upon bottom 19 of the housing 4. Suitably journaled in the bottom 19 are three stub shafts 20, 21 and 22. These stub shafts are suitably rotatably journaled in bearings in the bottom plate 19 and keyed to the shaft 20 is a gear 23. Keyed to the shaft 22 is a gear 24 the same size as gear 23. Between these gears 23 and 24 and fixed on the shaft 21 for rotation therewith, is a pinion 25 meshing with both the gears 23 and 24.

Also journaled in the bottom plate 19 is a fourth shaft 26 extending upwardly therefrom a substantial distance, and keyed to this rotatable shaft is a pinion 27 meshing with the gear 24. Secured to the shaft 26 intermediate its ends, is a worm gear 28 meshing with which is a worm 29 on a drive shaft 30 extending through one side wall of the housing 4 and provided on its outer end with a driving member 31 which may be provided with a hand grip 32 for manual operation, and optionally with a belt 33 for power operation. Obviously, therefore, rotation of the drive shaft 30 will through the worm 29, worm gear 28 and pinion 27, cause rotation of the gears 23 and 24 in the same direction and at the same speed.

The upper surface of the gear 23 is provided with a channel member 34 and on the upper surface of the gear 24 is a similar channel member 35. These channel members are preferably but not necessarily made integral with the gears. The groove provided by the channel 34 on gear 23 provides a guideway for an adjustable shoe member 36 provided with a trunnion 37 extending longitudinally within the channel groove and provided at one end with a locking screw 38 whereby the shoe 36 may be adjustably locked in any desired position longitudinally of the channel groove and at any predetermined fixed point from the center of the gear 23.

Likewise the channel groove 35 on the gear 24 adjustably receives a shoe member 39 through which is screw threaded a screw pin 40, the opposite end of which is rotatably journaled in a lug 41 provided on the journal member 35. The opposite end of the screw pin 40 is provided with a turning head 42 which is in alignment with an opening 43 in the side wall of the housing 4 and through which a wrench or other turning tool may be passed into turning engagement with the head 42 whereby the shoe 39 may be adjusted longitudinally within the channel 35 to any predetermined position with respect to the center of the gear 24. The threaded engagement between the screw pin 40 and the shoe 39 serves to hold this shoe in any fixed position.

Pivotally mounted at one end on the shoe 36 is a bar or beam which for convenience of reference will hereafter be referred to as the "A" beam. The opposite end of this "A" beam is pivotally secured to the shoe 39 in the channel member 35. Thus the "A" beam forms a link connection between the gears 23 and 24, and as the gears rotate in unison the "A" beam follows such rotation. The "A" beam describes a path concentric with gears 23 and 24, the radius of which is the same as the distance from the centers of such gears to the shoes to which the "A" beam is attached. It may be stated here that the forward and rearward movement of the "A" beam is, by suitable mechanism to be described, translated into longitudinal movement of the carriage 10 on the housing 4, and consequently of the torch holding ring member 16 longitudinally of the pipe 18 whereby to cut the end of the pipe to a shape as indicated at 44 in Figure 11, so as to fit the curvature of the wall of the intersected pipe. Consequently in adjusting the shoes 36 and 39 in the channels 34 and 35, this adjustment should be made with respect to the inside diameter of the intersecting pipe, in this illustration or example, the 6″ pipe 18. Such adjustment, of course, positions the "A" beam with respect to the centers of the gears 23 and 24, thereby increasing or decreasing the radius of movement of such "A" beam.

The adjustment of the shoes 36 and 39 and consequently of the "A" beam, is made as follows: The locking pin 38 on the pin 37 is first loosened so as to permit free sliding movement of the pin and shoe in the channel groove 34. It will be noted that there is provided directly above the opening 43 in the housing 4 a second opening 45 through which is adapted to pass a gauge pin 46 normally urged outwardly from the housing by a coil spring 47, and which pin is suitably scaled or graduated in pipe sizes, the graduations being mathematically worked out for inside pipe diameters. It will be noted, too, that this gauge pin 46 is in alignment with the adjacent end of the A beam so that when the gauge pin is pressed inwardly against the tension of its spring, its inner end may engage with the end of the "A" beam. In making the adjustment, for instance, for the 6″ pipe 18, the operator presses inwardly on the gauge pin 46 until the graduation corresponding to the inside diameter of the 6″ pipe registers with a predetermined fixed point on the side wall of the housing 4 and holding the gauge pin in such position, the operator by a suitable tool rotates the screw rod 40 to bring the shoe 39 and consequently the "A" beam towards the inner end of the gauge pin 46 until the end of the "A" beam touches the same. The gauge rod may then be released and the locking pin 38 adjusted to fixed locking position, whereby the "A" beam is properly adjusted for the inside diameter of the 6″ pipe to be cut. It should be stated here that when making such adjustment, the gears 23 and 24 should be rotated to bring the channel grooves thereof into perfect longitudinal alignment and with the "A" beam on the side of the housing adjacent the gauge pin, in order to properly center the adjusting screw for receiving the wrench or other adjusting tool.

The upper surface of the "A" beam is provided with a channel groove 48, and slidably positioned within this channel groove 48 is a shoe 49 provided with an upwardly extending pin 50 (see Figure 15). Fixed to the upward extending end of the pin 50 is a plate 51 extending laterally across above the adjacent sides of the gears 23 and 24 and at right angles to the "A" beam. This plate 51 is provided adjacent one edge with a graduated scale 52 for a purpose to be described.

It is obvious that because of the shoe connection 49 of the plate 51 with the channel groove 48 of the "A" beam, that the plate 51 if left free to do so, will be carried by and describe the same path of movement as the "A" beam. As a matter of fact, in the operation of the device, the plate 51 does follow exactly the lateral movement of the "A" beam because of the shoe connection 49 as the "A" beam moves with the rotation of the gears 23 and 24. The longitudinal movement, that is to the right and left in Figures 1 and 2, of the plate 51 is modified in the following manner.

Pivoted to each end of the plate 51, as by the removable pivot pins 53, are the rack bars 54 having teeth 55 cut on one side thereof. These rack bars 54 are guided for longitudinal adjustment through supporting guide members 56, and provided adjacent the rack bars and suitably journaled in bearings provided on the bottom plate 19 of the housing 4, are wide faced gears 57 meshing at their lower portions with the teeth of the rack bars 54 and at the upper portions with pinions 58 suitably supported directly over the rack bars 54. Suitable bearing caps 59 are provided for these pinions serving also as bearings for the mounting of the pinions 58 and gears 57. The stub shaft 60 upon which the pinion 58 is mounted, is suitably provided with a head to permit the turning thereof by a wrench or tool member whereby the pinions 58 may be rotated, thereby rotating the gears 57 and consequently adjusting the rack bars 54 longitudinally, and consequently likewise adjusting the plate 51 longitudinally with respect to the channel groove 48 on the "A" beam. This adjustment of the rack bars 54 relates to the outside diameter of the pipe to be intersected, and the length of the rack bars 54 between the plate 51 and the pivot points 60 of the rack bars, governs the amount of longitudinal travel of the plate 51, that is, to the right and left in Figures 1 and 2, and consequently the longitudinal movement of the carriage 10 and the torch carrying ring member 16, whereby the cut on the end of the pipe 18 will be of the proper shape to fit exactly the circular wall of the pipe to be intersected. The adjustment of the pin 60 and consequently of the rack bars 54 may be suitably indicated by a graduated scale and marker calibrated in terms of outside pipe diameters.

It will be clearly noted from the foregoing that as the gears 23 and 24 are rotated and the "A" beam moves therewith, the plate 51 will move the "A" beam laterally, that is, at right angles to the longitudinal line of the "A" beam, but will not follow the longitudinal movement of the "A" beam because of the sliding shoe connection 49 therewith. This lateral movement of the plate 51 with the "A" beam, however, causes the rack bars 54 to turn around the pivots 60, thus causing the ends of the rack bars to which is secured the plate 51, to describe an arc. Obviously the plate 51 describes an arc, the radius of which is dependent upon the length of the rack bars from the pivot point 60 to the pivot points 53 and as the plate 51 follows such arc, it necessarily moves forward and backward, that is, to the left and right in Figure 2. This forward and backward movement of the plate 51 is transmitted to the carriage 10 in a manner to be described.

The pin 50 which extends upwardly through the plate 51 and to which the plate 51 is secured, has pivoted on its upper end and loosely supported upon the upper surface of the plate 51 an elongated shoe 61. Removably mounted on the upper surface of the plate 51 is an arm which for the purpose of convenient description will be hereafter referred to as the "B" beam. This "B" beam has on its underside a channel groove 62 running longitudinally thereof and wherein fits the elongated shoe 61. This "B" beam is therefore freely rotatable on the plate 51 and also freely slidable, being guided in its sliding movement by the shoe 61. The "B" beam is provided at one edge centrally thereof, with a pointer 63 which is adapted to cooperate with the calibrated scale 52 for a purpose to be described.

The "B" beam is provided exactly on center with an opening 64 extending through the top to receive a pin 65 carried by the central supporting boss 15 of the carriage and extending downwardly into the opening 64. Thus the "B" beam is connected with the plate 51 in a manner to transmit the right and left movement of the plate 51 in Figure 2 to the carriage 10, whereas the lateral movement of the plate 51 with the "A" beam is not transmitted to the carriage because of a sliding shoe connection 61 with the "A" beam.

It is clearly noted, therefore, from the foregoing description that by virtue of the adjustment of the "A" beam on the gears 23 and 24 and the adjustment of the rack bars 54, there is mechanically generated a line of movement of the cutting torch longitudinally of the pipe 18 corresponding to the size of the pipe to be intersected, whereby as the cutting torch travels around the pipe 18 in the manner described, it is also moved longitudinally thereof, whereby the cut is made on the end of the pipe in exact accordance with the intended intersection line. It is again repeated that the generation of this cutting line is accomplished by the adjustment of the "A" beam on the gears 23 and 24 corresponding to the inside diameter of the intersecting pipe and by the adjustment of the rack bars 54 in accordance with the outside diameter of the intersected pipe. The movements of the "A" and "B" beams are, through these adjustments, translated into reciprocal movement of the carriage and cutting torch in exact accordance with the pipe sizes and circumferential shape.

In the illustration just described it has been assumed that the cut to be made on the end of the pipe 18 is to be a "square" cut, that is, nonangular with respect to the longitudinal center of the pipe. Circumstances may dictate that the end of the pipe be cut in the manner above described but at an angle to the longitudinal center of the pipe in order to make a connection or fitting such as is shown at 66 in Figure 9. For such a cut the same adjustments are made as before described with respect to the "A" beam and the rack bars 54, namely for the sizes of pipe to be joined. An additional adjustment, however, is necessary for the angular cut and this is made by the "B" beam being turned on the plate 51 at the desired angle of cut.

Figure 2:
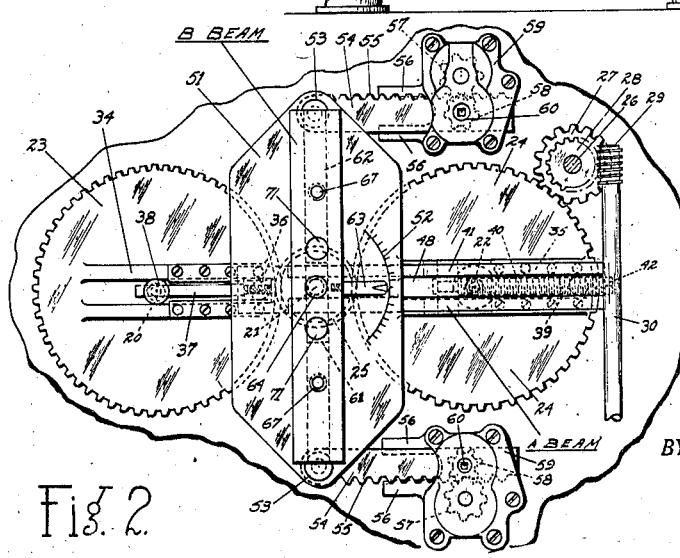
Figure 2 is a fragmentary top plan view of the generating mechanism.

It will be noted with reference to Figures 2 and 4 particularly, that the "B" beam is provided with a threaded opening 67 in its top surface which is adapted to register with an arcuate slot 68 provided in the supporting web 14 of the carriage. A headed bolt 69 may be passed through the slot 68 and into the threaded opening 67 whereby to adjustably lock the "B" beam in any adjusted angular position. Therefore, if for instance, the cut on the end of the pipe 18 is to be made at an angle of 30 degrees, the locking bolt 69 is loosened and the "B" beam is turned to a 30 degree angle, as indicated by the pointer 63 on the scale 52, on whichever side of the pipe the cut is to be made, and the locking bolt 69 set or locked. It will be noted that the change in the angular position of the "B" beam in the manner just described, will through its shoe connection 61 with the plate 51 cause a different arc of oscillation of the rack bars 54 and the plate 51 than when in the central adjustment before described. This different arcuate oscillation of the plate 51 is translated into a different longitudinal movement of the carriage through the "B" beam, such movement of the carriage resulting in the cutting torch following a path on the end of the pipe 18, a greater distance forwardly and rearwardly than for the "square" cut previously described, thus forming the end of the pipe 18 with an angularly disposed cut suitable for the connection indicated at 66 in Figure 9.

In further explanation of this generation of the cutting line, it may be pointed out that upon one complete rotation of the gears 23 and 24, from the position shown in Figure 2 for instance, the carriage and consequently the torch will move to four distinct limits of travel. The first stage of travel, assuming the torch to be in position on top of pipe 18 shown in Figure 1, will be around to the side center of the pipe and rearwardly of its starting position when the "A" beam reaches the limit of its lateral movement due to the first quarter turn of the gears. If the "B" beam is set on center as in Figure 2, the next movement of the carriage and torch will be from the side center of the pipe around to the exact underside of the pipe and in vertical alignment with the starting position, the "A" beam in this position being again longitudinally aligned with the channel members 34 and 35 on the gears. The next section of travel brings the torch again rearwardly on the pipe on the opposite side and in alignment with the side center position above mentioned as reached at the end of the first travel. In this position the "A" beam is again laterally displaced, but in the opposite direction. The final travel of the torch is again forwardly and upwardly to the starting position with the "A" beam returning to the position in Figure 2.

If now the "B" beam is adjusted angularly as above described, the change in the arc described by the plate 51, due to the angle at which the shoe 61 in the "B" beam guides the plate 51, causes a change in the path of travel of the cutting torch during its circuit around the pipe. With this angular setting, the first quarter turn of the gears 23 and 24 will bring the cutting torch rearwardly on the pipe and to the side center thereof. Continued movement of the gears to the next quarter position will first cause a continuation of the rearward movement of the torch beyond the side center position just mentioned, before it again moves forwardly of the pipe. When the second quarter turn of the gears has been reached, the torch will be on the underside of the pipe but at a point rearwardly of the starting position because of the additional rearward movement caused by the additional travel of the carriage as above explained. The travel of the torch through the third quarter movement of the gears, starts the torch again rearwardly and up the other side of the pipe to a point on the opposite side center of the pipe but forwardly of the position it occupied on the first quarter stop. Continued rotation of the gears through the last quarter of rotation, moves the torch again rearwardly for a short distance and then forwardly and upwardly to the starting position. Thus, a cut is made on the end of the pipe at an angle thereto, leaving the top cut edge of the pipe in the position shown in Figure 8 projecting beyond the lower cut edge thereof.

It will be understood, of course, that while the movements of this generating and cutting mechanism are being described in connection with one particular set of pipe sizes and one particular angle of cut, these examples are illustrative only and it will be clear from them and from the description that a large variety of angles and pipe sizes are possible through the use of the adjustments herein described.

In the examples just described, one for a square end cut and one for an angular end cut, the cuts have been made on "center" with respect to the longitudinal center of the pipe. It may be desirable and necessary to make the cut, either square cut or the angular cut, off center one side or the other of the pipe such as illustrated at 70 in Figure 10. For this purpose a simple adjustment only is necessary in addition to those heretofore described.

It will be noted from Figure 2 that in addition to the opening 64 in the direct center of the "B" beam, there are provided on either side thereof additional openings 71 for moving the "B" beam longitudinally on the plate 51 and bringing either of the selected openings 71 to center locking position for locking with the carriage by means of the pin 65. It is obvious that such an adjustment of the "B" beam results in again changing the arc of oscillation of the rack bars 54 and plate 51, and consequently the movement of the carriage 10 and cutting torch longitudinally of the pipe, whereby the cut on the end of the pipe, whether it is an angular cut as just described or a square cut as first described, is generated off center on either side of the pipe depending upon which of the openings 71 in the "B" beam is shifted to the center position.

It is not deemed necessary to go into a detailed description of the exact path of the cutting torch on this offset cut such as was above given for the square cut and the angular cut, as it is believed that the path followed by the torch will be readily understood from the other descriptions.

There is still one other type of cut for the ends of pipe which should be here referred to, and that is what will be called as a "straight" cut for the purpose of permitting the angular connection or joinder of two pipe ends or for permitting an angular intersection of the pipe end with a plane surface. For such a cut on the end of the pipe, it is obvious that inasmuch as the end does not have to conform to a cylindrical surface but rather to a flat plane or surface, the travel of the carriage and cutting torch will be rearwardly for only one-half of the revolution of the gears 23 and 24 and then forwardly for the last half of the revolution of such gears instead of two rearward movements and two forward movements. To generate this line of cut, for instance, a square cut straight around the end of the pipe for right angular intersection with a plane surface, the parts are as shown in Figure 2 except that the connecting pivot pins 53 between the plate 51 and the rack bars 54 are removed or disconnected so that there is no connection between the plate 51 and the rack bars. It will be obvious, therefore, that there will be no longitudinal movement, that is, right and left, in Figure 2, of the plate 51 and consequently of the "B" beam and the carriage 10. Therefore, the cutting torch will, through the driving mechanism described, simply rotate in a straight path around the pipe, cutting the same squarely.

Figure 12:
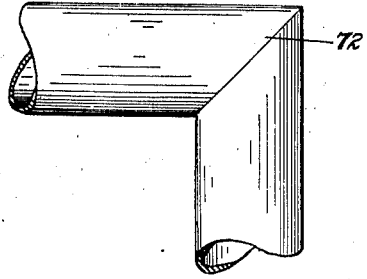
Figure 14:
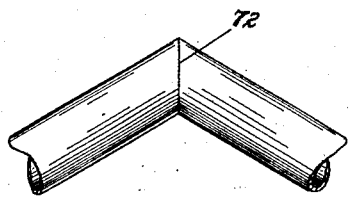
Figure 13:
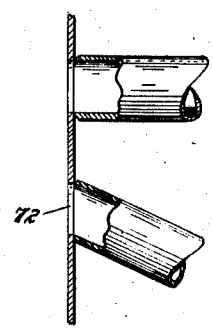

If now it is desired to make a straight cut on the end of the pipe but on an angle to the longitudinal center thereof for the connections as shown at 72 in Figures 12, 13 and 14, the "B" beam is turned to the desired angle as indicated on the scale 52 and locked to the carriage by means of the locking pin 65, whereupon rotation of the gears 23 and 24 and consequent movement of the "A" beam, will transmit right and left movement in Figure 2 to the plate 51 and to the carriage 10. With this adjustment, the rotation of the gears 23 and 24 and the movement of the "A" beam therewith through one half of such rotation and movement will result in moving the torch from the top position shown in Figure 1 to the bottom of the pipe and rearwardly thereof on the desired angle. The second half rotation of the gears and movement of the "A" beam, will return the torch to the top and starting position.

From the foregoing description it will be obvious that by a very few simple adjustments the generating mechanism forming my invention, makes possible a large variety and selection of cuts on the ends of pipe of various sizes.

Figure 7:
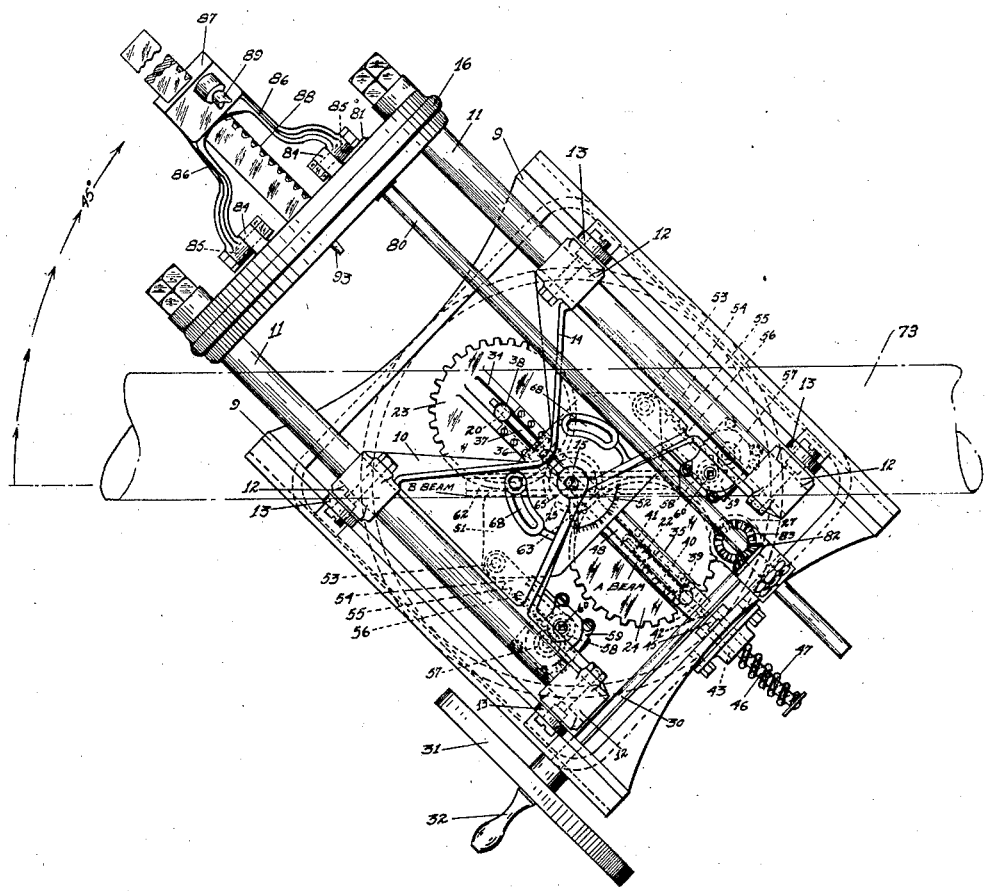
Figure 7 is a top plan view of the machine similar to Figure 4 but showing the mechanism position at a 45 degree angle with respect to the longitudinal line of the pipe to be cut.
Figure 8:
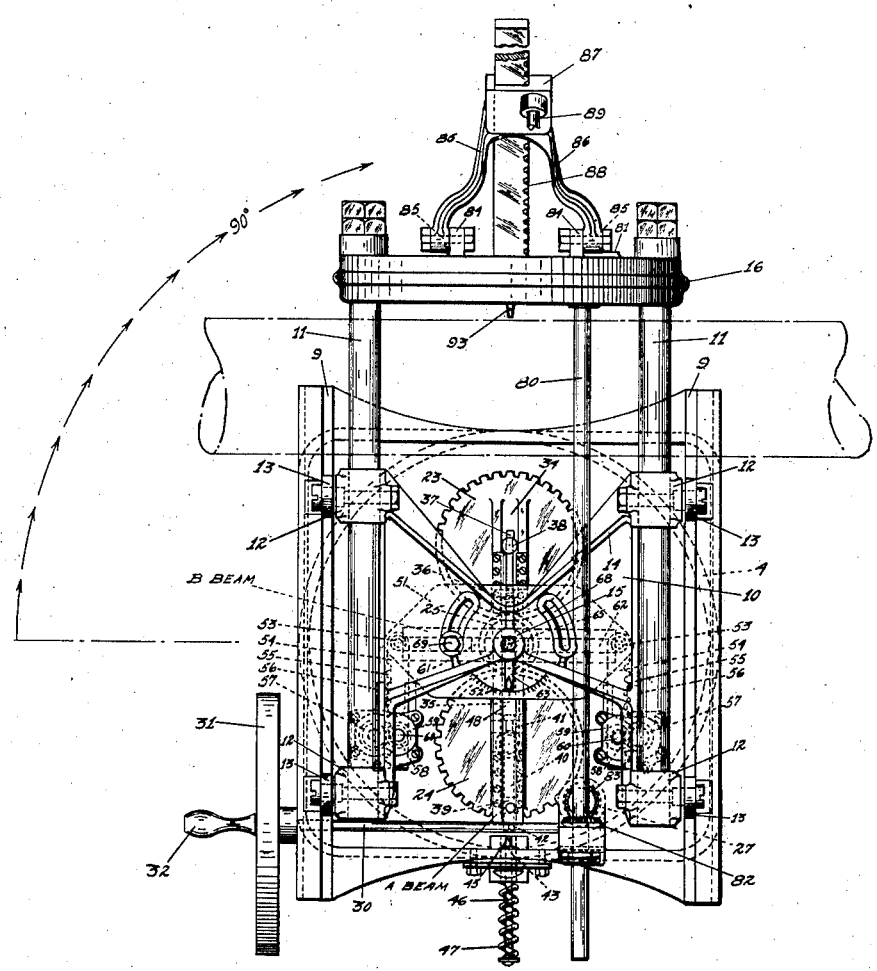
Figure 8 is a similar top plan view showing the mechanism adjusted to a 90 degree angle with the line of the pipe to be cut.
Figure 9:
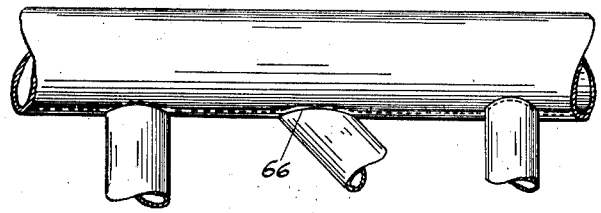
Figure 11:
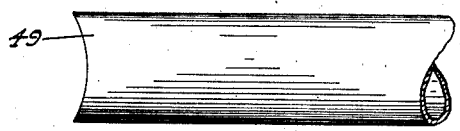
Figure 10:
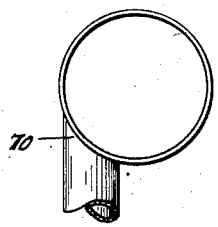

The operation of the machine and the cuts above described have all been for preparing or forming the ends of the pipe for intersection with another pipe. By my invention I have provided a composite machine which by simple and easy adjustment makes possible the cutting and forming of the walls of a pipe to be intersected, as well as the ends of the intersecting pipe. Referring now more particularly to Figures 7 and 8 of the drawings and also to Figures 1 and 2 as illustrating the generating mechanism in detail, the operation of the machine for forming holes or openings in the side wall of the pipe to be intersected will now be described.

As was before noted, the housing 4 is rotatably adjustable on the base member 1, and if it is desired to cut an opening in the side of the pipe, for instance, the pipe 73 in Figure 7, the housing 4 and all the mechanism carried thereby, is turned on the base 1 out of longitudinal alignment with the pipe, whereby to position the torch carrying ring member 16 alongside the pipe. When the housing 4 and its mechanism is turned to the position shown in Figure 7, now a position 45 degrees from the longitudinal center of the pipe, the torch carrying ring member clears the pipe and is alongside the pipe. In this position an opening may be cut in the side of the pipe on an angle of 45 degrees from the longitudinal center thereof. It is, of course, obvious that by further adjustment of the housing 4 and the generating mechanism to the left in Figure 7, a desired angle of cut with respect to the longitudinal alignment of pipe may be made. Figure 8 shows the mechanism adjusted to the position at a 90 degree angle from the longitudinal alignment of pipe. It will be understood, of course, that this adjustment of the housing 4 and the generating mechanism may be made at any angle between 45 degrees on either side of the position shown in Figure 8.

Assume now that an opening is to be cut in the pipe 73 which for example, we will designate as an 8" pipe to be intersected by the 6" pipe 18 which has had its end previously formed for such connection. Assume further that the opening to be cut in the side wall of the pipe is to be at right angles thereto or a "square neck" cut for a right angular intersection. For such cut the housing 4 is adjusted to the right angular position shown in Figure 8 and the torch adjusted as above described into cutting position with respect to the side wall of the pipe. The adjustments of the generating mechanism are the same as before, first adjusting the "A" beam to the inside diameter of the intersecting pipe, in this instance the 6" pipe, and secondly adjusting the rack bars 54 in accordance with the outside diameter of the intersected pipe, in this instance the pipe 73. The "B" beam is adjusted and fixed in zero position at exact right angles to the "A" beam. With this adjustment rotation of the gears 23 and 24 and simultaneously of the cutting torch, results in the first quarter section of travel of the gears, moving the torch 93 from the starting point, which we will assume to be the top center of the opening to be cut, to the right and following the curvature of the pipe outwardly to the right hand limit of the cut. The next quarter section turn of the gears moves the torch to the left and inwardly following the curvature of the pipe to the bottom center of the opening to be cut. The third quarter turn of the gears moves the torch still to the left and outwardly following the curvature of the pipe to the left end of the cut. The last quarter rotation of the gears brings the torch back to the right and inwardly to the starting position. The same principle of generation of the cutting line operates for this type of cut as was explained for the end cutting.

Now, assuming that the opening to be cut in the pipe to be intersected is to be on an angle either one side or the other of the "square neck" cut just described. The housing 4 and its generating mechanism is turned to the desired angle of cut; for instance, to 45 degrees as shown in Figure 7. The "B" beam is now adjusted angularly over the scale 52 to the 45 degree angle position, in which position it is locked to the carriage in the manner before described. The same operations as heretofore described are performed, resulting in the longitudinal travel of the carriage 10 and the cutting torch, this time modifying in exactly the same manner as was described in connection with making the angular cut on the end of the pipe, wherein the distance of travel of the torch and carriage along the axis of the pipe is greater in one direction than in the other, whereby to form such angular cut. It is deemed unnecessary to describe the detailed progress of the parts in this cutting operation as they are exactly the same as before described in connection with the angular cut on the end of the pipe.

Likewise, if the opening to be cut is to be positioned off center with respect to the pipe, the same adjustment is made as described for the end cuts, namely, the use of one of the openings 71 instead of the opening 64 in the "B" beam as the connection between such beam and the carriage.

No further detailed description of the operation of my invention is believed necessary. Of course, many changes may be made in details of construction and operation without departing from the spirit and scope of my invention. I do not limit myself, therefore, to the exact form herein shown and described other than by the appended claims.

I claim:

1. A cutting apparatus for forming intersecting connections comprising a cutting torch and mechanical means for generating with said torch a required line of cut, said means comprising a rotating member, a beam movable thereby, a second beam movable by and guided by said first beam, and means connecting said beams and said torch whereby movement of the beams is translated into torch movement.

2. A cutting apparatus for forming intersecting connections comprising a cutting torch and mechanical means for generating with said torch a required line of cut, said means comprising a rotating member, a beam movable thereby, a second beam movable by and guided by said first beam, and means connecting said beams and said torch whereby movement of the beams is translated into torch movement, said beams and said connecting means being adjustable whereby to vary the path of movement of said torch.

3. A cutting apparatus for forming intersecting connections comprising a cutting torch and mechanical means for generating with said torch a required line of cut, said means comprising a rotating member, a beam movable thereby, a second beam movable by and guided by said first beam, and means connecting said beams and said torch whereby movement of the beams is translated into torch movement, said entire mechanical means being adjustable as a unit with respect to a surface being cut.

4. A cutting apparatus for forming intersecting connections, comprising a carriage support, means for adjusting said support angularly with respect to a surface to be cut, a carriage on said support, a cutting torch on said carriage, mechanical means on said support and adjustable therewith and having operative connections with said carriage and said torch for generating a required line of cut with said torch, said mechanical means comprising a pair of rotatable members carrying a beam, a second beam slidably connected with said first beam, and means for translating the combined movements of said beams into movement of said carriage.

5. A cutting apparatus for forming intersecting connections, comprising a carriage support, means for adjusting said support angularly with respect to a surface to be cut, a carriage on said support, a cutting torch on said carriage, mechanical means on said support and adjustable therewith and having operative connections with said carriage and said torch for generating a required line of cut with said torch, said mechanical means comprising a pair of rotatable members carrying a beam, a second beam slidably connected with said first beam, means for translating the combined movements of said beams into movement of said carriage, and means for adjusting said beams whereby the required movement of said carriage is controlled.

6. A cutting apparatus for forming intersecting connections, comprising a rotatably adjustable carriage support, a carriage on said support adapted for longitudinal movement, a cutting torch on said carriage adapted for circumferential movement, mechanical means on said support for generating a required line of cut with said torch, said means comprising a pair of rotatable members adapted for simultaneous movement, a beam pivoted to both of said members and adapted to follow the movement thereof, a second beam slidably connected with said first beam and adapted for movement thereby and angularly thereto, and means connecting said beams and carriage whereby the combined movement of said beams is translated into movement of said carriage.

7. A cutting apparatus for forming intersecting connections, comprising a rotatably adjustable carriage support, a carriage on said support adapted for longitudinal movement, a cutting torch on said carriage adapted for circumferential movement, mechanical means on said support for generating a required line of cut with said torch, said means comprising a pair of rotatable members adapted for simultaneous movement, a beam pivoted to both of said members and adapted to follow the movement thereof, a second beam slidably connected with said first beam and adapted for movement thereby and angularly thereto, and means connecting said beams and carriage whereby the combined movement of said beams is translated into movement of said carriage, said connecting means being adjustable angularly whereby to vary the translated movement of said carriage.

8. A cutting apparatus for forming intersecting connections, comprising a rotatably adjustable carriage support, a carriage on said support adapted for longitudinal movement, a cutting torch on said carriage adapted for circumferential movement, mechanical means on said support for generating a required line of cut with said torch, said means comprising a pair of rotatable members adapted for simultaneous movement, a beam pivoted to both of said members and adapted to follow the movement thereof, a second beam slidably connected with said first beam and adapted for movement thereby and angularly thereto, means connecting said beams and carriage whereby the combined movement of said beams is translated into movement of said carriage, and independently adjustable means cooperating with said beams for influencing the movement of said carriage.

9. A cutting apparatus for forming intersecting connections, comprising a rotatably adjustable carriage support, a carriage on said support adapted for longitudinal movement, a cutting torch on said carriage adapted for circumferential movement, mechanical means on said support for generating a required line of cut with said torch, said means comprising a pair of rotatable members adapted for simultaneous movement, a beam pivoted to both of said members and adapted to follow the movement thereof, a second beam slidably connected with said first beam and adapted for movement thereby and angularly thereto, means connecting said beams and carriage whereby the combined movement of said beams is translated into movement of said carriage, and independently adjustable means cooperating with said beams for influencing the movement of said carriage, said independent means comprising arms pivoted at one end to fixed pivots and cooperating at their opposite ends with said beams.

In testimony whereof, I affix my signature.

DWIGHT GERBER.